United States Patent Office 3,202,317
Patented Aug. 24, 1965

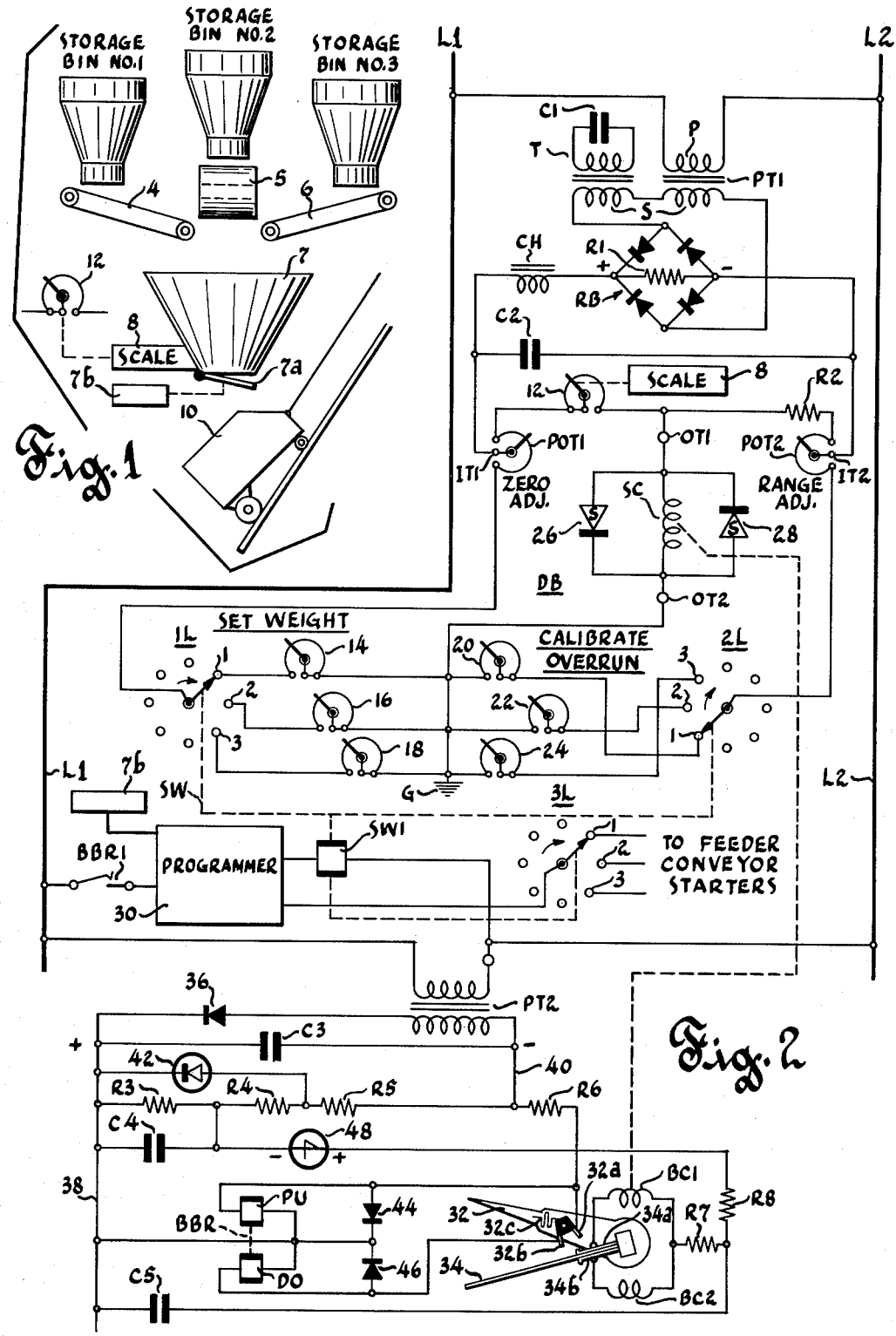
Aug. 24, 1965    D. W. FATH ETAL    3,202,317
DETECTION AND CONTROL SYSTEM
Filed June 10, 1963

3,202,317
DETECTION AND CONTROL SYSTEM
Douglas W. Fath, Brookfield, Frank J. Kleewein, Milwaukee, and Gene C. Lutsch, Hales Corners, Wis., assignors to Cutler-Hammer, Inc., Milwaukee, Wis., a corporation of Delaware
Filed June 10, 1963, Ser. No. 286,590
13 Claims. (Cl. 222—14)

This invention relates to detection and control systems and more particularly to extremely sensitive systems for detecting preselected conditions and for performing control functions in response thereto.

While not limited thereto, the invention is especially applicable to automatic weight detection systems for controlling dispensing of material for material batching.

An object of the invention is to provide an improved detection and control system.

A more specific object of the invention is to provide improved means for controlling dispensing of material for batching which is exteremely sensitive to a uniform characteristic of the material such as weight or the like.

Another specific object of the invention is to provide improved means for affording accurately measured batching of a plurality of different materials in a desired order under fully automatic control.

A further object of the invention is to provide a direct-acting non-amplifying system of utmost simplicity for controlling accurately measured batching of one or more materials.

Other objects and advantages of the invention will hereinafter appear.

These and other objects and advantages of the invention and the manner of obtaining them will best be understood by reference to the following detailed description of an embodiment thereof taken in conjunction with the accompanying drawings wherein:

FIGURE 1 is a schematic illustration of one type of apparatus to control of which the invention may be applied; and FIG. 2 is a circuit diagram showing a detection and control system constructed in accordance with the invention.

Referring to FIG. 1, there is shown for exemplary purposes a material dispensing and weighing system to which the invention may be applied.

This system is provided with means for dispensing or feeding material such as granular, comminuted or crushed material into a weigh hopper, for stopping the feeding when a preselected amount has been fed therein, for discharging the material from the weigh hopper into a carrier or the like and for automatically controlling recycling of the system for repetitive batching of material. As shown in FIG. 1, the system is provided with a plurality of storage bins Nos. 1, 2 and 3 from which material is dispensed. While only three storage bins are shown, it will be understood that the system will accommodate a larger number thereof.

Each storage bin is provided with means for dispensing material therefrom into a weigh hopper. This means comprises a feeder conveyor 4 for storage bin No. 1, a feeder conveyor 5 for storage bin No. 2 and a feeder conveyor 6 for storage bin No. 3. Alternatively, vibrators or the like may be used for feeding materials from the storage bins. It will be apparent that whenever a conveyor 4, 5 or 6 is started running, it will feed material from the associated storage bin into weigh hopper 7. When the conveyor is stopped, the material will jam in the bin discharge opening to stop the flow thereof.

Weigh hopper 7 is provided with means for detecting or sensing the amount of material being received therein and for performing a control function when a predetermined amount of material has been fed therein or when a preselected limit of material is known to be on its way to the weigh hopper. This means comprises a detecting device such as a weighing scale 8 or the like. While a scale is shown for exemplary purposes, it will be understood that the invention contemplates other detecting means capable of responding to a uniform characteristic of the material being dispensed.

When scale 8 detects that the selected amount of material has been fed or is on its way to the weigh hopper, the feeding is stopped and discharge gate 7a is opened by gate operator 7b which may be an electrically operated pneumatic cylinder or the like to discharge the material into a carrier 10 such as a skip car or the like which conveys the batch of material to a utilization device. Instead of dropping the material into the skip car, the system could be used to fill bags or boxes with measured amounts of material as they travel beneath the hopper on an intermittently moving conveyor.

As depicted schematically in FIG. 1, the thing that detects or measures the amount of material such as scale 8 is provided with means for operating the system. This means comprises a circuit control device or bridge balancing device such as rheostat 12. An important feature of the invention is that the material detecting means operates a device that provides an electrical signal that is proportional to a substantially uniform characteristic of the material such as weight. That is, the signal that is provided must be an analog of a uniform characteristic of the material. Rheostat 12 is an extremely high resolution device. Resolution is defined as the smallest increment of shaft angle or rotation which will produce a corresponding change in the output signal. In such manner, the invention is capable of dispensing or batching material with extreme accuracy as hereinafter described.

The apparatus shown in FIG. 1 operates the control system shown in FIG. 2. To this end, scale 8 and rheostat 12 are shown also in FIG. 2 to illustrate the relationship between these elements and the circuit. The system in FIG. 2 is supplied from an alternating current source through power supply lines L1 and L2. This system is provided with a bridge circuit having means for preselecting a plurality of different materials or the same type of material for batching. A programmer is provided for operating the bridge circuit so that it will control successive batching of different materials or the same type of material as desired. A sensitive contact-making meter device is included in the bridge circuit for detecting an operating condition thereof and for initiating a control function.

The bridge circuit comprises a pair of input terminals IT1 and IT2 and a pair of output terminals OT1 and OT2. Input terminals IT1 and IT2 are supplied from lines L1 and L2. To this end, lines L1 and L2 are connected to the primary winding P of a transformer PT1 having a secondary winding S connected to the input terminals of a full-wave rectifier bridge RB. Transformer PT1 is provided with a tertiary winding T connected across a capacitor C1. This transformer supplies bridge RB with a harmonic containing, regulated, alternating voltage having a voltage collapsing characteristic on overload and bridge RB is provided with a constant minimum load for protective purposes. This constant minimum load comprises a resistor R1 connected across the output terminals of bridge RB. To smooth the output voltage of rectifier bridge RB, its positive output terminal is connected through a choke coil CH to input terminal IT1 of detector bridge DB and its negative terminal is connected to input terminal IT2, there being a smoothing capacitor C2 connected across the input terminals of the detector bridge.

Input terminals IT1 and IT2 are connected to the movable taps of potentiometers POT1 and POT2, respectively. One side of zero adjustment potentiometer POT1 is connected through the aforementioned scale rheostat 12 to output terminal OT1 and the other side thereof is connected to the movable contact of a first level 1L of a selector switch SW. The stationary contacts, 1, 2, 3, etc., of switch level 1L are connected through respective weight setter rheostats 14, 16, 18, etc., to output terminal OT2 of the detector bridge. One side of range adjusting potentiometer POT2 is connected through a resistor R2 to output terminal OT1 and the other side thereof is connected to the movable contact of a second level 2L of switch SW. Stationary contacts 1, 2, 3, etc., of switch level 2L are connected through respective rheostats 20, 22, 24, etc., to output terminal OT2. Output terminal OT2 is connected to ground potential G.

Output terminals OT1 and OT2 of the detector bridge are connected across signal coil SC of an ultra-sensitive continuous reading meter relay. This signal coil is protected by a pair of low level overload devices comprising unidirectional conducting diodes 26 and 28. One type of overload device suitable for use herein is a "stabistor" or stabilizing varsitor used as a low level voltage regulating device. Diodes 26 and 28 are connected across coil SC and are poled in opposite directions whereby an overload voltage causes current flow therethrough to protect coil SC. Thus, coil SC is protected from both polarities of overload.

A programmer 30 is supplied from line L1 through a normally open contact BBR1 of a bridge balance relay BBR and is connected through a stepping magnet SW1 of selector switch SW to line L2. Programmer 30 is also connected to the movable contact of the third level 3L of selector switch SW. Stationary contacts 1, 2, 3, etc., of level 3L are connected to feeder conveyor starters. That is, the stationary contacts of level 3L are connected to motor starter circuits of feeder conveyors 4, 5 and 6, respectively. Thus, whenever the movable contact of level 3L rests on a stationary contact such as contact 1, the associated feeder conveyor such as conveyor 4 may be started by closure of contact BBR1. Programmer 30 may also operate stepping magnet SW1 after each emptying of weigh hopper 7 or may maintain the selector switch SW on one setting for a plurality of batching operations as desired.

The meter relay whose signal coil SC is shown in the right-hand portion of FIG. 2 is provided with a pair of booster coils BC1 and BC2, a set-point arm 32 and an indicating and contacting pointer 34. Set-point arm 32 is manually adjustable to a desired angular position dependent upon the magnitude of detector bridge unbalance signal desired to initiate dispensing and the degree of rebalancing desired to stop dispensing. Set-point arm 32 is provided with an inverted V-shaped toggle structure mounted thereon. The toggle comprises a pair of contacts 32a and 32b insulated from one another and an overcenter spring 32c which maintains the toggle in its clockwise or counterclockwise overcenter position.

Pointer 34 comprises an elongated indicator which may traverse an appropriate scale in response to energization of signal coil SC to show the magnitude of the bridge unbalance. Pointer 34 also comprises a pair of contacts 34a and 34b insulated from one another for energizing respective booster coils BC1 and BC2 alternately as hereinafter described and for controlling bridge balance relay BBR. For energizing this portion of the circuit, the primary winding of a transformer PT2 is connected across supply lines L1 and L2. One end of the transformer secondary winding is connected through a half-wave rectifier 36 to positive conductor 38 and the other end is connected to negative conductor 40. A smoothing capacitor C3 is connected between conductors 38 and 40. Three resistors R3, R4 and R5 are connected in series from conductor 38 to conductor 40. A smoothing capacitor C4 is connected across resistor R3. A voltage regulator or limiter such as a zener diode 42 is connected across resistors R3 and R4.

Positive conductor 38 is connected through pickup coil PU of bridge balance relay BBR to contact 32a and is connected through coil PU and a resistor R6 to negative conductor 40. Dropout coil DO of relay BBR is connected between positive conductor 38 and contact 32b. Inductive discharge, unidirectional diodes 44 and 46 are connected across coils PU and DO, respectively.

Pointer contact 34a is connected through booster coil BC1, resistors R7 and R8 and a switching device such as a Shockley diode 48 to the junction between resistors R3 and R4. Pointer contact 34b is connected through booster coil BC2 to the junction between booster coil BC1 and resistor R7. A smoothing capacitor C5 is connected between positive conductor 38 and the junction between resistors R7 and R8.

The operation of the system will now be described. Referring to FIG. 1, it will be apparent that when material is being fed from one of the storage bins by a conveyor into the weigh hopper, such material will flow continuously in accordance with the conveyor speed. The scale will indicate only the amount of material that is in the weigh hopper and will not indicate the material that is falling at any instant into the weigh hopper or overrun material or material that will continue to be dispensed after a stopping signal is applied due to inherent lag in the system. Therefore, means must be provided for stopping the feeding a predetermined time before the desired amount of material has actually settled in the weigh hopper so that when feeding stops the correct amount of material will appear in the weigh hopper. To this end, detector bridge DB is provided with overrun calibrating rheostats 20, 22 and 24, one for each material. These rheostats may be adjusted for so-called turning-off-earlier settings in accordance with the dispensing means employed and the different materials that are dispensed which settings for specific materials can be experimentally ascertained.

The amount of each material by weight that is to be fed into the weigh hopper is set on rheostats 14, 16 and 18. Potentiometer POT1 affords a zero adjustment, that is, adjustment of the meter to indicate zero when the weight is zero. Potentiometer POT2 affords scale calibration or range adjustment at the high end so that an accurate indication will be given throughout the range of weights that are batched.

When power is applied to lines L1 and L2, transformers PT1 and PT2 are energized. As a result, a unidirectional voltage is applied from rectifier bridge RB across the movable taps of potentiometers POT1 and POT2. If the detector bridge is balanced, current flows through scale rheostat 12 and resistor R2 in one path and through switch level 1L, rheostats 14 and 20 and switch level 2L in another path. Under such balanced condition, the voltage will be the same value at output terminal OT1 as it is at output terminal OT2 so that no current flows through signal coil SC.

Energization of transformer PT2 causes a half-wave rectified voltage to appear across conductors 38 and 40. Capacitor C3 smooths this half-wave voltage. Some current flows through resistors R3, R4 and R5 which have relatively high resistance values. Voltage regulator 42 maintains a constant voltage across resistors R3 and R4 so that the voltage at the junction thereof remains constant. Capacitor C4 smooths the voltage across resistor R3. The current flow through pickup coil PU and resistor R6 is not sufficient to energize the pickup coil for contact closure because resistor R6 has a high resistance value.

Let it be assumed that weight selection rheostat 14 is set so that detector bridge DB becomes unbalanced. As a result, current flows through signal coil SC. Coil SC rotates pointer 34 in the clockwise direction whereby contact 34a engages contact 32a. Current flows from conductor 38 through pickup coil PU, contacts 32a and 34a, booster coil BC1, resistors R7 and R8 and switching diode 48 to the junction between resistors R3 and R4. Booster coil BC1 increases the pressure between contacts 32a and 34a to maintain good engagement therebetween. Resistors R7 and R8 have small resistance values compared to resistor R6 so that the current flow causes energization of pickup coil PU and closure of contact BBR1. The voltage in this circuit causes diode 48 to switch from its high impedance state to its low impedance state to increase the current flow in pickup coil PU thereby to increase the pressure between contacts 32a and 34a and to maintain contact BBR1 closed.

Pointer 34 may rotate far enough depending upon the setting of set-point arm 32 so that contact 34a pivots the inverted U-shaped toggle counterclockwise over dead center whereby spring 32c maintains it in its new position. Contact 34a then disengages contact 32a as pointer 34 moves further. However, pickup coil PU is maintained energized through resistor R6 sufficiently to maintain contact BBR1 closed.

Closure of contact BBR1 completes a circuit through programmer 30 and switch level 3L to a feeder conveyor starter whereby conveyor 4 starts running to feed material into weigh hopper 7. As material flows into the weigh hopper, scale 8 rotates the movable tap of scale rheostat 12 in a direction to balance the detector bridge. As scale 8 rotates rheostat 12, the current in signal coil SC decreases. This causes pointer 34 to rotate back in the counterclockwise direction. When the detector bridge becomes balanced indicating that the proper amount of material is on its way to weigh hopper 7, contact 34b engages contact 32b to energize booster coil BC2 and dropout coil DO. Booster coil BC2 rotates pointer 34 more to increase the contact pressure. Dropout coil DO reopens contact BBR1 to stop feeder conveyor 4. As pointer 34 moves clockwise, contact 34b pivots the inverted U-shaped toggle overcenter back to its original or reset position where it is maintained by spring 32c thereby to afford immediate resetting of the system. Gate 7a of the weigh hopper may then be opened and closed by gate operator 7b under the control of programmer 30 or by other means to discharge the measured amount of material into skip car 10 whereby it is hauled away.

While programmer 30 may take various forms, it preferably includes means which can be preset to operate stepping magnet SW1 after each emptying of the weigh hopper so that successive batches are taken from different storage bins. Such means would also be alternatively presettable to maintain stepping magnet SW1 inoperable whereby successive batches would be taken from the same storage bin after each emptying of the weigh hopper. For example, stepping magnet SW1 may be of the type which rotates selector switch SW to the next contact upon deenergization. Thus, when contact BBR1 closes as aforesaid, stepping magnet SW1 energizes and extends a pawl in a known manner to engage the next tooth on a ratchet wheel. When contact BBR1 reopens to stop feeding as aforesaid, programmer 30 empties the weigh hopper and then deenergizes stepping magnet SW1. As a result, the pawl is withdrawn under spring action or the like to rotate switch SW to the next contact. Thus, by setting calibrating rheostats 20, 22 and 24 beforehand for particular materials, such materials can be dispensed in succession under fully automatic control. This system is especially adapted for dispensing more than one material into the weigh hopper before it is emptied. For this purpose, rheostats 14, 16 and 18 are set in an accumulative manner since they are connectable one at a time by switchlevel 1L into the detector bridge. For example, if 300 pounds of the first material, 200 pounds of the second material and 100 pounds of the third material are desired in a single batch in the weigh hopper, rheostat 14 is set at 300 pounds, rheostat 16 is set at 500 pounds and rheostat 18 is set at 600 pounds. In this manner, the system will dispense 300 pounds of the first material and rebalance and step the selector switch to the next position. Since the system was balanced at 300 pounds, it will be unbalanced in the second position of the selector switch, will dispense 200 pounds to bring the total weight of the hopper to 500 pounds and will balance and step to the third position. Since rheostat 18 is set at 600 pounds, the bridge will become unbalanced again and will dispense 100 pounds of the third material to complete the batching operation. It will be apparent that under the operation just described, each rheostat 14, 16 and 18 will be set at and will indicate the total weight of the material that the system will dispense up to the corresponding step. In other words, this total will be given directly and no computations are required.

The system hereinbefore described provides a simple, accurate and convenient means of remotely setting the weights of various materials directly and individually, detecting the amount of material delivered and stopping the delivery of the material at the proper time. The invention can be applied to a conventional mechanical scale modified so that the scale pointer or other moving part drives an extremely low torque, infinite resolution rheostat 12. The scale driven rheostat is arranged so that its wiper position represents the weight detected by the scale.

The amounts of materials by weight or other uniform characteristics that are desired are represented by the selective settings of individual weight selection rheostats 14, 16 and 18. Each of these rheostats may be provided with a multi-turn digital dial so calibrated that the indicating digits read the amount of material desired directly as by pounds or hundreds of pounds or the like.

Since coil SC is an ultra-sensitive meter-relay signal coil, it is protected in both directions by overload devices 26 and 28. The meter-relay contact operating point is externally adjustable by moving set-point arm 32, thus allowing simple sensitivity adjustment. The selector switch affords convenient use of a multiplicity of material set points by selective or successive switching into the detector bridge the proper set-point rheostat and overrun calibrating rheostat at the desired time. While rotary stepping switch levels have been shown for this purpose, it will be appreciated that the invention contemplates other selector devices of the relay or static type of either the recycling or programmed type.

The detector bridge may be made insensitive to temperature changes by using balanced components in all legs thereof and by using oversize components that are unaffected by operating currents. Noise effects are minimized by selective filtering and low impedance including a center point ground connection G. The non-amplifying detector construction reduces externally generated noise therein.

The invention simplifies adjustment of the system sensitivity uniquely to fit the materials being handled. This affords optimizing of system performance on individual applications.

The simplicity of the system using very few components lends itself to very low maintenance and trouble free operation even under adverse conditions. However, it provides a flexible, simple, direct set-up of various materials to be batched from any desired point in a plant.

The predetermined order in which the different materials from the three storage bins are dispensed may be changed by reconnecting the weight selecting rheostats 14, 16 and 18 and the overrun adjustment rheostats 20, 22 and 24 to the stationary contacts 1, 2 and 3 of respective switch levels 1L and 2L in a different order or by rearranging the different materials in the bins in which case it might be necessary to readjust the overrun adjustment devices.

While the system hereinbefore described is effectively adapted to fulfill the objects stated, it is to be understood that we do not intend to confine our invention to the particular embodiment of detection and control system disclosed, inasmuch as it is susceptible of various modifications without departing from the scope of the appended claims.

We claim:

1. In a detecting and control system for controlling dispensing of material to form batches thereof having a preselected amount of material therein:

an electrical power supply source;

a balanced bridge circuit supplied from said source;

means in one branch of said bridge circuit which is settable to preselect a desired amount of material to be dispensed thereby to unbalance said bridge circuit;

a continuously-indicating meter-relay connected directly to the output of said bridge circuit and control means operated thereby responsive to said bridge circuit when so unbalanced for initiating the dispensing of the material;

means connected in another branch of said bridge circuit for rebalancing the same;

means responsive to dispensing of said material for operating said rebalancing means in proportion to a substantially uniform characteristic of the material thereby to provide a continuous and accurate measure of the amount of material that has been dispensed and to rebalance said bridge circuit when the preselected amount of material has been dispensed, and means responsive to operation of said bridge circuit to an adjustable point in rebalancing direction for stopping the dispensing of material.

2. The invention defined in claim 1, wherein said bridge circuit comprises:

a resistance bridge having input terminals supplied from said source and output terminals for providing an output signal proportional to said unbalance;

and a zero adjustment device at one input terminal for balancing said bridge circuit prior to said preselection and dispensing.

3. The invention defined in claim 2, wherein said bridge circuit comprises:

a range adjustment device at the other input terminal for adjusting said bridge circuit so that it will become balanced when the operation of said rebalancing means corresponds to a large-amount setting of said material preselecting means.

4. The invention defined in claim 2, wherein said settable means for preselecting a desired amount of material comprises:

a variable resistor in one branch of said bridge circuit having a digital dial and scale calibrated to indicate directly amounts of material in quantity units.

5. The invention defined in claim 1, wherein said means for rebalancing said bridge circuit comprises:

a low torque, extremely high resolution variable resistance device;

and said means for operating said rebalancing means comprises means for varying said resistance device in proportion to the weight of material dispensed and in a direction to rebalance said bridge circuit.

6. The invention defined in claim 1, wherein said continuously indicating meter relay comprises:

a sensitive signal coil connected to said bridge circuit;

said control means comprising circuit means supplied from said source and being operable for causing starting of material flow;

and means in said meter-relay responsive to energization of said signal coil when said bridge circuit is unbalanced for operating said circuit means and for giving a continuous pointer indication of the amount of bridge unbalance.

7. The invention defined in claim 6, together with:

a pair of low voltage level, voltage regulating devices of the unidirectional current conducting type connected individually in opposite directions across said signal coil for protecting the latter from overload voltages of both polarities.

8. The invention defined in claim 1, wherein said means for operating said rebalancing means comprises:

a receptacle for receiving the material being dispensed;

and a weighing scale responsive to receipt of material in said receptacle for operating said rebalancing means.

9. In a detecting and control system for controlling dispensing for batching of preselected quantities of a plurality of materials;

a plurality of material dispensing devices;

control means for said material dispensing devices to control starting and stopping of feeding of materials therefrom;

a balanced bridge circuit;

means for energizing said bridge circuit;

a plurality of adjustable devices individually settable to preselect desired quantities of the respective materials to be dispensed;

connector means operable to connect said quantity selection devices one at a time into one branch of said bridge circuit and to select the associated material dispensing device for operation, such connection of a device that has been preset for a desired quantity of material causing said bridge circuit to become unbalanced;

means responsive to said unbalanced bridge circuit for operating said control means to initiate feeding of material from the selected dispensing device;

means connected in another branch of said bridge circuit for rebalancing the same;

means for operating said rebalancing means in proportion to a substantially uniform characteristic of the material being fed thereby to effect rebalancing of said bridge circuit when the selected quantity has been fed;

and means responsive to rebalancing of said bridge circuit for operating said control means to stop feeding from the selected dispensing device.

10. The invention defined in claim 9, together with means operable at the end of a dispensing cycle for operating said connector means to connect another one of said quantity selection devices in said one branch of said bridge circuit and to select another material dispensing device for operation thereby to form a second batch of different material.

11. In a detecting and control system for providing direct control of dispensing of material to form batches thereof having a preselected amount of material therein;

a unidirectional power supply source;

a balanced bridge circuit directly supplied from said source;

means in one branch of said bridge circuit which is settable to preselect a desired amount of material to be dispensed thereby to unbalance said bridge circuit;

a continuous-reading meter relay comprising a signal coil connected to the output of said bridge circuit and a meter and control means responsive to energization of said signal coil when said bridge circuit is unbalanced;

dispensing means having a starter circuit therefor which is responsive to said control means of said meter relay to start dispensing of material and said meter being continuously responsive to said signal coil to indicate unbalance of said bridge circuit;

means in another branch of said bridge circuit for rebalancing the same;

and means responsive to dispensing of material for directly actuating said rebalancing means in proportion to a substantially uniform characteristic of the material thereby to cause said meter relay to restore said starter circuit to stop dispensing of material when the preselected amount has been dispensed.

12. In a detecting and control system for controlling dispensing of material to form batches thereof having a preselected amount of material therein:
  an electrical power supply source;
  a balanced bridge circuit supplied from said source;
  means in one branch of said bridge circuit which is settable to preselect a desired amount of material to be dispensed thereby to unbalance said bridge circuit;
  means responsive to said bridge circuit when so unbalanced for initiating the dispensing of the material;
  means connected in another branch of said bridge circuit for rebalancing the same;
  means responsive to dispensing of said material for operating said rebalancing means in proportion to a substantially uniform characteristic of the material thereby to provide a continuous and accurate measure of the amount of material that has been dispensed and to rebalance said bridge circuit when the preselected amount of material has been dispensed;
  means responsive to rebalancing of said bridge circuit for stopping the dispensing of material;
  said dispensing means causing an overrun of material to occur after said bridge circuit is rebalanced unless said bridge circuit is adjusted to compensate therefor;
  and adjustable overrun compensation means in a third branch of said bridge circuit which is settable in accordance with the dispensing means to compensate for material overrun whereby the total material dispensed equals the amount thereof preselected.

13. In a detecting and control system for controlling dispensing and batching of preselected quantities of a plurality of materials;
  a balanced bridge circuit comprising a plurality of set-quantity devices sequentially connectable to said bridge circuit and which are accumulatively setttable to preselect desired quantities of respective materials to be dispensed to a receiver;
  sequence means operable to connect the first one of said set-quantity devices to said bridge circuit thereby to select a quantity of the first material causing unbalance of said bridge circuit;
  means responsive to said bridge circuit when so unbalanced for initiating feeding of the selected material to said receiver;
  means connected to said bridge circuit for rebalancing the same;
  means responsive to receipt of material at said receiver for operating said rebalancing means in proportion to a uniform characteristic of the material thereby to rebalance said bridge circuit when the selected quantity of said first material has been dispensed for movement to the receiver;
  and means responsive to rebalancing of said bridge circuit for stopping the feeding of said material and for operating said sequence means to disconnect the first device and to connect the next set-quantity device to said bridge circuit thereby to unbalance the latter in accordance wth the setting thereof and to dispense the next material in a similar manner.

References Cited by the Examiner

UNITED STATES PATENTS

| | | | |
|---|---|---|---|
| 2,936,096 | 5/60 | Shawhan | 222—76 X |
| 3,035,648 | 5/62 | Williams | 177—14 |
| 3,044,563 | 7/62 | Gumpertz et al. | 177—165 X |

LOUIS J. DEMBO, *Primary Examiner.*